(12) United States Patent
Nolan et al.

(10) Patent No.: US 11,307,436 B2
(45) Date of Patent: Apr. 19, 2022

(54) METHOD OF MANUFACTURING A SPECTACLE LENS, FINISHED UNCUT SPECTACLE LENS AND SEMI-FINISHED LENS BLANK

(71) Applicant: Carl Zeiss Vision International GmbH, Aalen (DE)

(72) Inventors: Angela Nolan, Black Forrest (AU); Michael Gall, Aberfoyle Park (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/373,421

(22) Filed: Jul. 12, 2021

(65) Prior Publication Data

US 2021/0341750 A1 Nov. 4, 2021

Related U.S. Application Data

(63) Continuation of application No. PCT/EP2020/052266, filed on Jan. 30, 2020.

(30) Foreign Application Priority Data

Jan. 30, 2019 (EP) .................................. 19154553

(51) Int. Cl.
| | |
|---|---|
| *B29D 11/00* | (2006.01) |
| *G02C 7/02* | (2006.01) |
| *G02C 7/06* | (2006.01) |

(52) U.S. Cl.
CPC .......... *G02C 7/02* (2013.01); *B29D 11/00009* (2013.01); *G02C 7/068* (2013.01)

(58) Field of Classification Search
CPC ..... G02C 7/02; G02C 7/068; B29D 11/00009
See application file for complete search history.

(56) References Cited

U.S. PATENT DOCUMENTS

| | | |
|---|---|---|
| 3,645,610 A | 2/1972 | Duckwall et al. |
| 4,504,128 A | 3/1985 | Guilino et al. |

(Continued)

FOREIGN PATENT DOCUMENTS

| | | |
|---|---|---|
| BE | 899997 A1 | 10/1984 |
| CN | 108333795 A | 7/2018 |

(Continued)

OTHER PUBLICATIONS

Ophthalmic optics—Spectacle lenses—Vocabulary (ISO 13666:2012); German and English version EN ISO 13666:2012, Oct. 2013.

(Continued)

*Primary Examiner* — Mathieu D Vargot
(74) *Attorney, Agent, or Firm* — Thrive IP®; Georg Hasselmann

(57) ABSTRACT

A finished uncut spectacle lens has a curved front surface including an optical bowl with a convex curvature and a peripheral lentic zone surrounding the optical bowl. The curvature of the curved front surface in the peripheral lentic zone is flatter than in the optical bowl. The optical bowl size is large enough that a lens filling the entire frame can be glazed from it. The inclusion of a flatter peripheral lentic zone enables a larger diameter of the finished unglazed lens (d) with larger edge thickness than would be possible if the same back surface was cut on a semi-finished blank having a uniform spherical front, without compromise to the finished lens center thickness. In addition, a method of manufacturing such a spectacle lens and a semi-finished lens blank used in the method are provided.

19 Claims, 5 Drawing Sheets

(56) References Cited

U.S. PATENT DOCUMENTS

| | | | |
|---|---|---|---|
| 4,561,736 | A | 12/1985 | Fuerter et al. |
| 4,784,482 | A | 11/1988 | Guilino |
| 5,805,263 | A | 9/1998 | Reymondet et al. |
| 6,440,335 | B1 | 8/2002 | Kingsbury et al. |
| 2008/0026679 | A1* | 1/2008 | Siders ................ B24B 13/0057 451/42 |
| 2012/0013846 | A1 | 1/2012 | Duersteler Lopez et al. |

FOREIGN PATENT DOCUMENTS

| | | |
|---|---|---|
| EP | 2947505 A | 11/2015 |
| GB | 466620 A | 6/1937 |
| JP | 2013000719 A1 | 1/2013 |
| WO | 2019106399 A1 | 6/2019 |

OTHER PUBLICATIONS

Extended European Search Report issued in EP 19154553.2, to which this application claims priority, dated Aug. 5, 2019 (In English).

International Search Report and Written Opinion issued in PCT/EP2020/052266, to which this application claims priority, dated Mar. 27, 2020 (In English).

Office action by the European Patent Office issued in EP 19154553.2, to which this application claims priority, dated Feb. 18, 2021 (In English).

International Preliminary Report on Patentability issued in PCT/EP2020/052266, to which this application claims priority, dated May 7, 2021 (In English).

Office action by the European Patent Office issued in EP 20 701 790.6, which is a counterpart hereof, dated Feb. 4, 2022 (In English).

* cited by examiner

METHOD OF MANUFACTURING A SPECTACLE LENS, FINISHED UNCUT SPECTACLE LENS AND SEMI-FINISHED LENS BLANK

CROSS REFERENCE TO RELATED APPLICATIONS

This application is a continuation application of international patent application PCT/EP2020/052266, filed Jan. 30, 2020, designating the United States and claiming priority from European application EP19154553.2, filed Jan. 30, 2019, and the entire content of both applications is incorporated herein by reference.

TECHNICAL FIELD

The present disclosure relates to a finished uncut spectacle lens, to a semi-finished lens blank used for manufacturing a spectacle lens and to a method of manufacturing a spectacle lens. In particular, the disclosure relates to a spectacle lens having improved design for manufacturing without affecting the optical properties for the wearer, as well as to a semi-finished lens blank used for manufacturing such a spectacle lens as well as to the manufacturing of such a spectacle lens. Specifically the disclosure facilitates making spectacle lenses as thin as possible in the section that is glazed to the frame, while enabling the spectacle lens outside of the frame to be made thicker and to a uniform diameter for the benefit of the manufacturing steps prior to glazing, without increasing the complexity of the lens back surface.

BACKGROUND

These days, the manufacturing of a surfaced spectacle lens is largely automated. The manufacturing starts with calculating the individualized lens based on prescription data received from an eye care professional. The calculated data is then made available to the machines used in the manufacturing process. Based on the data calculated from the prescription, a semi-finished lens blank is selected from which the spectacle lens will be manufactured. These semi-finished lens blanks are sometimes called "pucks" because of their shape. They typically have a front surface already in the correct spherical form, usually needing only the back side to be cut and polished to produce a back surface reflecting the individual prescription for the wearer. After selecting the semi-finished lens blank, its front surface is attached to a standardized block by which it can be held while the back surface is cut and polished to a shape calculated from the data contained in the prescription. After the cutting and polishing processes, the lens back surface combined with the front surface provides a lens having the optical correction specified in the prescription when mounted in the frame.

During the machining step the diameter of the semi-finished lens blank is normally reduced to a value smaller than the original semi-finished lens blank, but larger than the dimensions of the frame to which it is to be fitted. This process is commonly termed cribbing. The spectacle lens which has its final shape for front and back surface but is cribbed to a size larger than the frame is commonly referred to as a finished uncut spectacle lens. The reduced diameter of the finished uncut spectacle lens may be circular or elliptical, or may be complex in shape. Spherical prescriptions in the plus range typically have a physical form being thicker in their geometric center and thinner at the edge; these prescriptions are more likely to benefit from a complex cribbing shape to remove any thin edges of the finished uncut spectacle lenses when they occur around the perimeter, while still keeping the cribbing shape larger than the frame area. These thin edges are otherwise liable to break in the machining process, or cause cuts for instance during manual handling, or to the soft polishing pads.

Optional steps like tinting may be applied to the finished uncut spectacle lens, and it may be coated for instance to make its surfaces scratch resistant and durable. Further treatments, such as for example anti-reflective, anti-fog, and easy-clean coatings, may also be applied.

The glazing process comprises a careful diameter reduction of the finished uncut spectacle lens, usually to micrometer precision, to adapt it to the frame. At this time the edge may be specially shaped, for instance having a bevel applied, to enable it to key into the frame for a secure fit.

It is beneficial to have the cribbed shape of the finished uncut spectacle lens larger than the frame shape until the final glazing step so that any coating defects around the edge such as coating clip marks, resin roll backs, etc., are removed by the edging process for glazing the spectacle lens to the frame. Further, it would be advantageous for the cribbed diameter to be circular, and also to be the same for all spectacle lenses, for various manufacturing steps such as enabling a single size of the supportive blocking mount, to simplify the polishing method, and to facilitate robotic handling of the finished uncut spectacle lenses during which the finished uncut spectacle lenses are held by their cribbed edge. If a single circular diameter was chosen, it would need to be large enough to encompass the largest frame size for spectacle lenses being ordered. Also the cribbed edge would need to have a minimum thickness to provide physical stability during these steps, avoiding edge chips and preventing cuts due to sharp edges during manual handling and cuts to polishing pads.

Unfortunately, having a large circular cribbed shape is problematic for the production of spectacle lenses having positive spherical prescriptions. These spectacle lenses typically have a convex front surface and a concave back surface where the curvature of the back surface is flatter than the curvature of the front surface. As a consequence of this physical form, the thickness at the geometric center of the spectacle lens is limited by the edge thickness of the spectacle lens; if a fixed target edge thickness is maintained, then the center thickness of the spectacle lens will increase with increased spectacle lens diameter. For example, two finished uncut spectacle lenses made with the same 8D front curvature, the same refractive index of 1.5 and the same +5D sphere prescription and 1 mm edge thickness would have different thickness in the geometrical center if one of it had a cribbed diameter of 50 mm while the other one had a cribbed diameter of 70 mm. The 50 mm diameter finished uncut spectacle lens would have a thickness in the geometrical center of 4.2 mm compared to 7.5 mm for the 70 mm diameter finished uncut spectacle lens. After glazing to the frame, the spectacle lens that had been originally cribbed to the larger diameter would be thicker and heavier, and would be least preferred by the wearer.

To enable spectacle lenses to be made as thin as possible, the diameter of the finished uncut spectacle lenses is normally kept as small as possible while still enabling a limited extent of surface extending beyond the contour of the frame to which the spectacle lens shall be glazed. As an alternative, the back surface of the semi-finished lens blank may be machined such that the back surface of the finished uncut spectacle lens is made deliberately steeper in the peripheral zone to thicken the finished uncut spectacle lens outside of the frame shape. The use of this style of lenticular back surface can enable a suitable cribbed edge thickness with a large circular crib shape without significant increase to the thickness of the spectacle lens region that is glazed to the frame. This method has been described in US 2012/0013846 A1 and WO/2019/106399. A drawback of this way of increasing the edge thickness of the finished uncut spectacle lens is the much increased complexity of the back surface shape which requires a slower cutting process in order to maintain the surface design integrity, and which is also difficult to uniformly polish.

SUMMARY

It is an first of the present disclosure to provide a method of manufacture that allows for producing a finished uncut spectacle lens without slowing down the machining step for machining the back surface of the spectacle lens. It is a further objective of the present disclosure to provide a finished uncut spectacle lens with a sufficient diameter of the cribbed edge which can be manufactured without slowing down the machining step for machining the back surface of the semi-finished lens blank used in the manufacturing process considerably and, in many cases, with the same simple uniformity of back surface design as the smaller finished uncut spectacle lens. It is another objective of the present disclosure to provide a semi-finished lens blank that allows for producing a finished uncut spectacle lens without slowing down the machining step for machining the back surface of the spectacle lens and it is a fourth objective. Further, it is an additional objective of the present disclosure to enable a much reduced requirement for the back surface lenticular modification in the case that it should still be required for the particular spectacle lens prescription, frame size, lens material, crib diameter, and edge thickness.

The first objective and the additional objective are achieved by a method of manufacture a finished uncut spectacle lens, wherein the semi-finished lens blank has a peripheral lentic zone in which the curvature of the curved front surface deviates from the convex curvature of the optical bowl. The second objective and the additional objective are achieved by a finished uncut spectacle lens having a concavely curved back surface which includes a concave effective curvature which provides, together with the convex curvature of the optical bowl, a prescribed optical correction. The third objective and the additional objective are achieved by a semi-finished lens blank, wherein the radius of curvature of the front surface in the peripheral lentic zone is an infinite radius.

According to a first aspect, the disclosure provides a method of manufacturing a finished uncut spectacle lens that includes:

obtaining prescription data representing a prescribed optical correction for a wearer of the finished uncut spectacle lens to be manufactured;

providing a semi-finished lens blank with a curved front surface including an optical bowl with a convex curvature; and machining the semi-finished lens blank to create the finished uncut spectacle lens based on the prescription data.

In the disclosed method, a semi-finished lens blank is used that has a peripheral zone in which the curvature of the curved front surface deviates from the convex curvature of the optical bowl, in other words, the disclosed method uses an inventive semi-finished lens blank. A deviation of the curvature of the curved front surface from the convex curvature of the optical bowl means that the curvature in the peripheral zone is described by different parameter values than the convex curvature of the optical bowl. For example, the convex curvature of the optical bowl may be described by a certain value of a radius of curvature or by certain values of two radii of curvature if the optical bowl has a toric curvature where the value of a radius of curvature or the values of radii of curvature of the front surface in the peripheral zone differs/differ from the respective value/values of the curvature/curvatures of the optical bowl.

The use of an inventive semi-finished lens blank in the disclosed method allows a sufficient edge thickness of the finished uncut spectacle lens which facilitates manufacturing of the spectacle lens, as has already been described with respect to the inventive finished uncut spectacle lens and with respect to the inventive semi-finished lens blank. For further details it is referred to the corresponding explanations made with respect to the inventive spectacle lens and with respect to the inventive semi-finished lens blank.

In the disclosed method, the step of providing a semi-finished lens blank typically includes a step of selecting a semi-finished lens blank in which the convex curvature of the optical bowl already matches the curvature of the front surface of the spectacle lens to be manufactured, i.e., selecting an semi-finished lens blank having a convex curvature of the optical bowl that is suitable for the spectacle lens prescription, and the machining of the semi-finished lens blank is done solely by machining its back surface. Additionally or alternatively, the step of providing the semi-finished lens blank may include a step of selecting a semi-finished lens blank the optical bowl of which has dimensions large enough to cover the whole frame contour of a frame according to obtained frame data. To this end, the frame data may be included in the prescription data. Typically, a semi-finished lens blank is selected, the optical bowl of which has dimensions such that the diameter of the optical bowl is just larger than the frame contour.

Alternatively, the step of providing a semi-finished lens blank may include a step of obtaining frame data and a step of surfacing the optical bowl of an existing standard semi-finished lens blank, i.e., a semi-finished lens blank with a standard convex curvature and a standard diameter of the optical bowl, based on the prescription data and the frame data to form a customized convex curvature and customized dimensions of the optical bowl. Such surfacing can be done using standard digital surfacing processes applied to the front surface of the semi-finished lens blank. This would enable a bespoke choice of optical bowl dimensions for the particular prescription and frame data, with the aim to match the optical bowl size more closely to the frame dimensions of the individual spectacle lens request, enabling the finished spectacle lens center thickness to be minimized for the desired diameter of the finished uncut spectacle lens and the cribbed edge thickness.

The disclosed method may include a step of obtaining frame data and a step of calculating a surface representation of the back surface to be achieved by the machining step, wherein in the calculation of the surface representation accounts for the dimensions of the optical bowl and the frame data such that the center of the surface representation is offset from the center of the finished uncut spectacle lens. The machining of the back surface of the semi-finished lens blank is done such as to achieve the back surface according to the calculated surface representation. When calculating the surface representation of the back surface to be machined, the center would be positioned relative to the geometric center of the finished uncut spectacle lens such that the frame contour of the glazed spectacle lens is positioned centrally within the optical bowl diameter with sufficient clearance so that the glazed spectacle lens includes only the optical bowl on its front surface and none of the peripheral lentic zone.

The calculation would ensure a minimum thickness within the perimeter of the frame contour, in order to satisfy impact strength requirements of the spectacle lens. Additionally, it would ensure a minimum thickness over the body of the finished uncut spectacle lens, which depending on the spectacle lens material might for instance be a minimum of 0.3 mm. Typically, this minimum thickness might occur at the position of the optical bowl diameter. The calculation would also ensure a minimum cribbed edge thickness which might be the same or greater than the criteria for minimum thickness in the body of the finished uncut spectacle lens.

The machining process steps would include selecting an appropriate diameter of blocking medium for mounting the semi-finished lens blank on a machining block and providing both the surface shape and height of the back surface to achieve a finished uncut spectacle lens having the desired optical power and thickness at the geometric center. The machining height calculations are made more complex by the unique front surface shape of the inventive semi-finished lens blank depending upon the diameter at which the front surface is supported by the blocking medium, the position of the front surface of the blocked lens might depend only on the sag of the optical bowl, or also include the sag of the peripheral lentic zone.

The calculation of the representation of the back surface could also include determining a lenticular back surface in the peripheral lentic zone to be used in conjunction with the inventive semi-finished lens blank if required to better minimize the center thickness of the finished uncut spectacle lens while maintaining the desired crib diameter and minimum thickness requirements at the position of the cribbed edge and the diameter of the optical bowl, in the manner previously described in WO/2019/106399. To this end, the method includes a step obtaining frame data and a step of calculating a modified back surface to be formed by the machining step, wherein a lenticular back surface is calculated based on the dimensions of the optical bowl, the frame data, the prescription data, and minimum lens thickness requirements. As previously noted, this lenticular back surface could be made simpler as compared to the related art where the minimum cribbed edge thickness must be achieved solely by a deviation of the curvature of the back surface in the peripheral lentic zone, without any thickness contribution from the front surface in a peripheral lentic zone.

According to a second aspect, the disclosure provides a finished uncut spectacle lens that comprises a curved front surface including an optical bowl with a convex curvature. Typically, the lateral dimensions of the optical bowl are large enough to fully receive a frame contour of a frame to which the spectacle lens is to be glazed. In addition, the finished uncut spectacle lens comprises a peripheral lentic zone surrounding the optical bowl. In the inventive finished uncut spectacle lens the curvature of the curved front surface in the peripheral lentic zone deviates from the convex curvature of the optical bowl. A deviation of the curvature of the curved front surface from the convex curvature of the optical bowl means that the curvature in the peripheral lentic zone is described by different parameter values than the convex curvature of the optical bowl. For example, the convex curvature of the optical bowl may be described by a certain value of a radius of curvature or by certain values of two radii of curvature (in case of a toric front surface) where the value of a radius of curvature or the values of radii of curvature of the front surface in the peripheral lentic zone differs/differ from the respective value/values of the radius/radii of curvature/curvatures of the optical bowl. In common ophthalmic nomenclature the peripheral lentic zone would be termed a front surface lentic.

With the inventive finished uncut spectacle lens, a large uniform circular crib shape can be enabled that is usable for all spectacle lens prescriptions—or at least for a large number of spectacle lens prescriptions. In addition, the inventive finished uncut spectacle lens ensures that the edge thickness at the cribbed edge does not fall under a minimum edge thickness for all spectacle lens prescriptions, or at least for a large number of spectacle lens prescriptions, without needing to thicken the geometric center of the finished uncut spectacle lens, even for spectacle lenses having a positive spherical prescription. The uniformity of crib diameter and ensuring not to fall below a minimum edge thickness for all spectacle lens prescriptions facilitates processing and handling of the finished uncut spectacle lens, in particular robotic handling. In addition, the shape of the back surface of the finished uncut spectacle lens does in most cases not need to be altered in order to increase its edge thickness, meaning the back surface is simplified for the machining and polishing processes. For instance, in the case of a prescription requiring a spherical or toroidal back surface, the finished uncut spectacle lens could be polished using even a conventional hard-lap method.

To satisfy impact strength requirements the finished uncut spectacle lens should have sufficient thickness over the contour of the frame. Additionally, in order for the finished uncut spectacle lens to be physically robust in the manufacturing process, including both robotic and manual handling, it requires a minimum thickness over the full diameter of the finished uncut spectacle lens. Due to the front surface geometry, and depending on the back surface shape and any prism of the spectacle lens, the minimum lens thickness of the inventive finished uncut spectacle lens will likely be positioned at the intersection of the optical bowl and the peripheral lentic zone. Depending on the lens material, a typical minimum thickness over the body of the finished uncut spectacle lens may, for example, be 0.3 mm. The minimum cribbed edge thickness may be specified separately, and for instance may be the same criteria as the minimum thickness in the body of the finished uncut spectacle lens, or a larger minimum, for instance 0.5 mm.

Typically, the convex curvature of the optical bowl is steeper than the curvature of the front surface in the peripheral lentic zone. In other words, the typically spherical convex curvature of the optical bowl has a first radius of curvature, and the curvature of the front surface in the peripheral lentic zone has a second radius of curvature. The second radius of curvature is larger than the first radius of curvature. This makes the convex curvature of the optical bowl steeper than the curvature of the front surface in the peripheral lentic zone, which increases the distance between the front surface of the finished uncut spectacle lens and the back surface of the finished uncut spectacle lens at its cribbed edge, thus increasing the thickness of the finished uncut spectacle lens at its cribbed edge. In case the convex curvature of the optical bowl is toric, the convex curvature would have a first radius of curvature in a first meridian and a second radius of curvature in a second meridian. Then, the curvature of the front surface in the peripheral lentic zone would have radii of curvature in these meridians which are larger than the respective radii of curvature of the optical bowl.

The inventive finished uncut spectacle lens has a curved back surface that includes a concave effective curvature which provides, together with the convex curvature of the optical bowl, a prescribed optical correction. The radius of curvature of the effective curvature is smaller than the radius of curvature of the front surface in the peripheral lentic zone. In particular, the radius of curvature of the front surface in the peripheral lentic zone may be an infinite radius or flat, which means that the curvature of the back surface is always steeper than the curvature of the front surface in the peripheral lentic zone.

In some cases, it might be advantageous that the curvature of the back surface also deviates in the peripheral lentic zone from that needed for the optical prescription, in order to further thicken the edges of the finished uncut spectacle lens outside of the frame contour. By this measure, the thickness of the finished uncut spectacle lens in its geometrical center can be further reduced. However, it should be noted that such a deviation of the curvature of the back surface in the peripheral lentic zone could be made simpler as compared to the related art where the increased edge thickness must be achieved solely by a deviation of the curvature of the back surface in the peripheral zone, without any thickness contribution from the front surface shape of a peripheral lentic zone.

In the inventive finished uncut spectacle lens, the optical bowl with the convex curvature and/or the effective curvature of the back surface may extend over an area of the finished uncut spectacle lens that is large enough to cover a frame contour of a frame to which the spectacle lens shall be glazed; while it could in principle be smaller, it is desirable to avoid optical aberrations in the peripheral view of the wearer as well as in view of the aesthetic perception of the glazed spectacle lenses.

The present disclosure is particularly useful for spectacle lenses with a positive spherical power which typically have a back surface that is flatter than the front surface. Although spectacle lenses with positive spherical power having a convex front surface as well as a convex back surface are possible, such spectacle lenses are not common due to aesthetic reasons. However, also in such cases the present disclosure can be used.

According to a third aspect of the present disclosure, a semi-finished lens blank for use in manufacturing a spectacle lens is provided. The semi-finished lens blank has a curved front surface including an optical bowl with a convex curvature and a peripheral lentic zone surrounding the optical bowl. The curvature of the curved front surface in the peripheral lentic zone deviates from the convex curvature of the optical bowl.

The inventive semi-finished lens blank, the front surface of which typically already corresponds to the front surface of the spectacle lens to be manufactured, can be used in manufacturing the inventive finished uncut spectacle lens, delivering all of the advantages that have been described. Thus, when a finished uncut spectacle lens is made from the inventive semi-finished lens blank to a particular thickness at geometric center, the front surface at the outer diameter which includes the peripheral lentic zone is positioned further from the back surface than in the case of a finished uncut spectacle lens made with a uniformly spherical front surface; accordingly the finished uncut spectacle lens will have a larger edge thickness when using the inventive semi-finished lens blank compared to a related art spherical semi-finished lens blank. In case of spectacle lenses with a prescription including a positive spherical power, the physical form of the spectacle lens is such that the center thickness of the spectacle lens is limited by the edge thickness; the use of the inventive semi-finished lens blank enables a smaller center thickness at a given finished uncut spectacle lens diameter, compared to a related art semi-finished lens blank.

The front surface of the inventive semi-finished lens blank could be made by a casting process in mass-manufacturing, in which case the front surface would be created by the front mold used to cast the blank. In the same way that semi-finished lens blanks are made in a range of base curves, a series of inventive semi-finished lens blanks could be produced having a range of optical bowl curvatures to accommodate different prescriptions of the finished spectacle lens. Additionally, these inventive semi-finished lens blanks could be made with a range of curvatures in the peripheral lentic zone. Further, they could be made with a range of optical bowl sizes, to accommodate different frame sizes.

Alternatively, the inventive semi-finished blanks could be made using digital surfacing and polishing processes applied to the convex surface of a related art semi-finished lens blank. This approach would enable a bespoke choice of optical bowl curvature, peripheral lentic zone curvature and optical bowl diameter, optimized to the prescription and frame of the spectacle lens request. Since the peripheral lentic zone of the inventive finished uncut spectacle lens would not appear within the glazed spectacle lens, it would not need to be manufactured to the same standard as the optical bowl for surface power or cosmetic quality, needing only to deliver the correct physical form to modify the front surface sag and deliver the expected edge thickness increase in the finished uncut spectacle lens.

Typically, the convex curvature of the optical bowl is steeper than the curvature of the front surface in the peripheral lentic zone. In other words, the typically spherical convex curvature of the optical bowl has a first radius of curvature, and the curvature of the front surface in the peripheral lentic zone has a second radius of curvature. The second radius of curvature is larger than the first radius of curvature. This makes the convex curvature of the optical bowl steeper than the curvature of the front surface in the peripheral lentic zone, which increases the distance between the front surface of the finished uncut spectacle lens and the back surface of the finished uncut spectacle lens at its cribbed edge, thus increasing the thickness of the finished uncut spectacle lens at its cribbed edge. In case the convex curvature of the optical bowl is toric, the convex curvature would have a first radius of curvature in a first meridian and a second radius of curvature in a second meridian. Then, the curvature of the front surface in the peripheral lentic zone would have radii of curvature in these meridians which are larger than the respective radii of curvature of the optical bowl. As already mentioned with respect to the inventive finished uncut spectacle lens this helps to prevent the front surface from eventually intersecting the back surface.

In order to allow to manufacture finished uncut spectacle lenses in which the optical bowl with the convex curvature extends over an area of the spectacle lens that is large enough to cover a frame contour of a frame to which the finished uncut spectacle lens shall be glazed, the semi-finished lens blank includes an optical bowl with a convex curvature which extends over an area of the semi-finished lens blank that is large enough to cover the frame contour of the respective frame.

In the inventive semi-finished lens blank, the radius curvature of the front surface in the peripheral lentic zone may be an infinite radius. This is advantageous for the same reasons that have already been described with respect to the inventive spectacle lens. It is therefore referred to the explanations made with respect to the inventive spectacle lens.

In addition, the disclosure provides a method of manufacturing a finished uncut spectacle lens. The method includes:

obtaining prescription data representing a prescribed optical correction for a wearer of the finished uncut spectacle lens to be manufactured;

providing a semi-finished lens blank with a curved front surface including an optical bowl with a convex curvature; and machining the semi-finished lens blank to create the finished uncut spectacle lens based on the prescription data.

BRIEF DESCRIPTION OF THE DRAWINGS

The disclosure will now be described with reference to the drawings wherein.

DESCRIPTION OF EXEMPLARY EMBODIMENTS

Definitions

Figure 1:
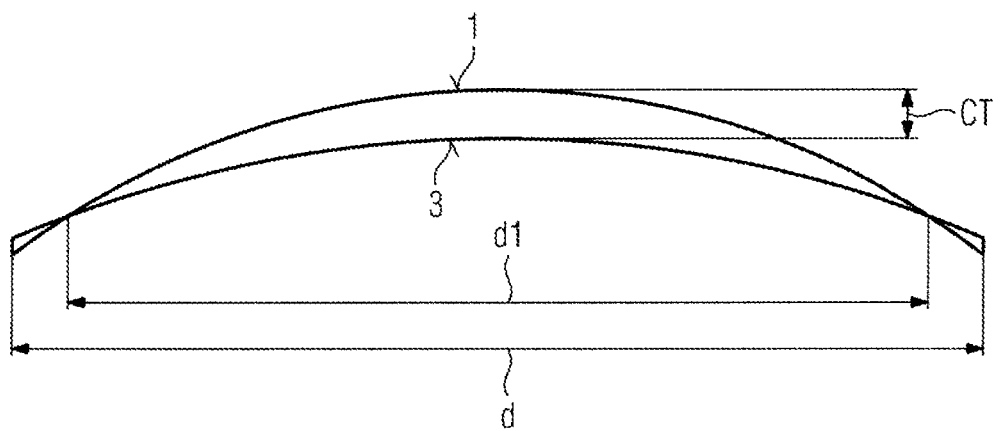
FIG. 1 illustrates the difficulty in manufacturing finished uncut spectacle lens with a large diameter and a small thickness in its geometrical center.

Throughout this specification the following definitions apply:

A "spectacle lens" is an ophthalmic lens, i.e., a lens intended to be used for purposes of measurement, correction, and/or protection of the eye, or for changing its appearance, worn in front of, but not in contact with, the eyeball (compare DIN EN ISO 13666:2013-10, sections 8.1.1 and 8.1.2).

The expression "spherical power" describes the power of a spectacle lens that brings a paraxial pencil of parallel light to a single focus, where a paraxial pencil of parallel light is a pencil of light with a central light ray in which the distance of the light rays contained in the pencil of light from the central ray is small and the angles of the rays of light with respect to the central ray can be approximated according to $\sin \alpha \approx \alpha$.

The expression "semi-finished lens blank" stands for an object that is used in a manufacturing process for manufacturing a spectacle lens as starting object from which the spectacle lens is manufactured. The curvature of at least a section a first surface of a semi-finished lens blank which is used as the mentioned starting object may already resemble the curvature of the spectacle lens to be manufactured by use of the semi-finished lens blank while at least a section of a second surface will be machined during the manufacturing process in order to bring it in a desired shape, which allows the spectacle lens to provide a prescribed optical correction. Typically, a semi-finished lens blank is molded using glass molds.

In the context of a spectacle lens the expression "front surface" is used for a surface of a spectacle lens which when mounted and worn in the frame faces away from the wearer's eye. In the context of a semi-finished lens blank, the expression "front surface" is used for a surface which will eventually become the front surface of a spectacle lens that is manufactured from the semi-finished lens blank. The curvature of a section of the front surface of a semi-finished lens blank which is used as a starting object from which a spectacle lens is manufactured may already resemble the curvature of the spectacle lens to be manufactured.

In the context of a spectacle lens, the expression "back surface" is used for a surface of a spectacle lens which when mounted and worn in the spectacle frame faces the wearer's eye. In the context of a semi-finished lens blank, the expression "back surface" is used for a surface which will eventually become the back surface of a spectacle lens that is manufactured from the semi-finished lens blank. The back surface of a semi-finished lens blank may be machined during the manufacturing process of a spectacle lens.

The expression "optical bowl" is used throughout this specification for the section of front surface on a semi-finished lens blank or on an uncut finished spectacle lens which is optically suitable to form the front surface of a spectacle lens, and which, together with the curvature that is machined to form the back surface of the finished spectacle lens or the uncut finished spectacle lens, provides the prescribed optical correction. In the related art, the optical bowl of the semi-finished lens blank typically covers the entire front surface of the semi-finished lens blank, whereas in the inventive semi-finished blank it is bounded by a peripheral lentic zone of the semi-finished lens blank.

The expression "peripheral lentic zone" refers to a peripheral zone of a semi-finished lens blank or of a finished uncut spectacle lens in which the curvature of the front surface deviates from the curvature of the front surface of the optical bowl.

The term "finished uncut spectacle lens" describes a lens formed on the front by the curvature of the semi-finished lens blank and on the back by the curvature of the machined back surface, which acting together to provide the prescribed optical correction, and which has a diameter intermediate between the semi-finished lens blank and the required frame dimension. Hence, a "finished uncut spectacle lens" is the spectacle lens before glazing.

The term "cribbing" describes the process of diameter reduction from the semi-finished lens blank to the finished uncut spectacle lens. Hence, the "cribbed edge" is the edge of the finished uncut spectacle lens prior to glazing.

The term "sag" describes the height or depth of a curved surface with respect to a given plane at a given diameter.

The term "principal meridian" stands for one of two mutually perpendicular meridians of a surface of an astigmatic-power lens, i.e., a spectacle lens used for correcting astigmatism, where a meridian of a surface is each plane which contains the center(s) of curvature of said surface and an astigmatic power lens is a spectacle lens bringing a paraxial pencil of parallel light to two separate line foci mutually at right angles (compare DIN EN ISO 13666:2013-10, sections 5.7.1 and 7.4).

A surface is called "spherical" if it is a part of an inside or outside surface of a sphere so that its cross section is circular in each meridian. A surface is called "aspherical" if it is a part of a surface of revolution having a continuously variable curvature from the vertex to the periphery (compare DIN EN ISO 13666:2013-10, sections 7.1 and 7.3).

A surface is called "toric" or "toroidal" if it has mutually perpendicular principal meridians of unequal curvature, where the cross section in both principal meridians is nominally circular. A surface is called "atoric" or "atoroidal" if the cross section in at least one of the principal meridians is not circular (compare DIN EN ISO 13666:2013-10, sections 7.5 and 7.6).

The term "prescription data" refers to data contained in a prescription from an eye specialist and relating to an optical correction to be provided by a spectacle lens. A prescribed optical correction is an optical correction according to the prescription data.

The term "effective curvature" is used for a curvature that has been shaped to provide, alone or in combination with at least one other surface, a certain effect, in particular a prescribed optical correction.

The expression "glazing" refers to insertion of a spectacle lens into a frame to produce spectacles for the wearer. This glazing process comprises a careful reduction of the spectacle lens diameter, usually to micrometer precision, to adapt it to the frame.

The term "frame contour" stands for the projection of the frame to which a spectacle lens is to be glazed onto the finished uncut spectacle lens such that the finished uncut spectacle lens can be cut along the line of the frame contour to adapt it to the frame.

The term "frame data" stands for data characterizing a frame to which a finishes uncut spectacle lens is to be glazed. The "frame data" in particular includes data allowing to determine the "frame contour."

The term "lateral dimensions" refers to dimensions in a direction that is perpendicular to the direction of the lens thickness in the geometrical center of the spectacle lens.

In the context of a semi-finished lens blank, the expression "base curve" is used for the surface power (or curvature) of the finished surface (compare DIN EN ISO 13666: 2013-10, section 11.4.2). In the present disclosure, the finished surface would be the surface of the optical bowl.

DETAILED DESCRIPTION

Before an exemplary embodiment of the disclosed method of manufacturing a finished uncut spectacle lens is described with respect to FIGS. 2 to 5, it will first be explained with reference to FIG. 1 the difficulty associated with manufacturing of finished uncut spectacle lenses which have a large diameter and a small thickness in their geometrical center.

When specifying a certain thickness of the spectacle lens in its geometrical center (marked as CT in FIG. 1) for each combination of a radius of curvature of a convex front surface 1 and a radius of curvature of a concave back surface 3 of a spectacle lens, there exists a diameter d1 at which the front surface 1 intersects the back surface 3 if the radius of curvature of the front surface 1 is larger than the radius of curvature of the back surface 3. The same would be true if the back surface 3 was a convex back surface. Where the front surface 1 intersects the back surface 3 the lens thickness becomes infinitesimally small.

During the manufacture of a spectacle lens the spectacle lens is cribbed, i.e., the diameter of the spectacle lens is reduced from the diameter of a semi-finished lens blank from which the spectacle lens is manufactured to a diameter larger than the minimum diameter required to glaze it to the frame. The lens with the completed surface on the front and back and having this cribbed diameter is termed a finished uncut spectacle lens. Prior to glazing, this finished uncut spectacle lens may be subject to further processing steps, for instance tinting for cosmetic or sunlens purposes, and/or applying coating treatments to reduce scratching and increase durability, to reduce reflections, reduce fogging, or increase cleanability of the spectacle lens. During these processing steps, the finished uncut spectacle lens is usually held by its cribbed edges. This, however, requires a minimum thickness of the cribbed edges.

For a given diameter of the finished uncut spectacle lens, the requirement of a minimum thickness of the cribbed edge results in a minimum thickness of the spectacle lens that can be produced for a given optical correction and a given diameter of the finished uncut spectacle lens. In particular, spectacle lenses with a positive spherical power typically have a convex front surface 1 and the concave back surface 3 where the radius of curvature of the back surface is larger than the radius of curvature of the front surface (such as the spectacle lens shown in FIG. 1). Moreover, in special cases the spectacle lens could also have a convex back surface which would, however, lead to the same difficulty as described with respect to FIG. 1. Only in case of a negative spherical power value this difficulty could be avoided because the radius of curvature of the back surface 3 would be smaller than the radius of curvature of the front surface 1 so that an intersection of the front surface and the back surface could be avoided for every diameter of the spectacle lens. It is apparent from FIG. 1 that the difficulty that has been described with respect to this drawing becomes more prominent the smaller the radius of curvature of the front surface 1 is with respect to the radius of curvature of the back surface 3.

Figure 2:
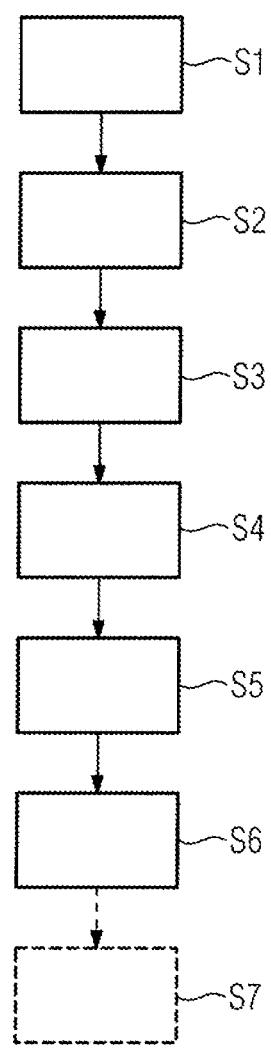
FIG. 2 is a flowchart illustrating a method of manufacturing a spectacle lens.
Figure 3:
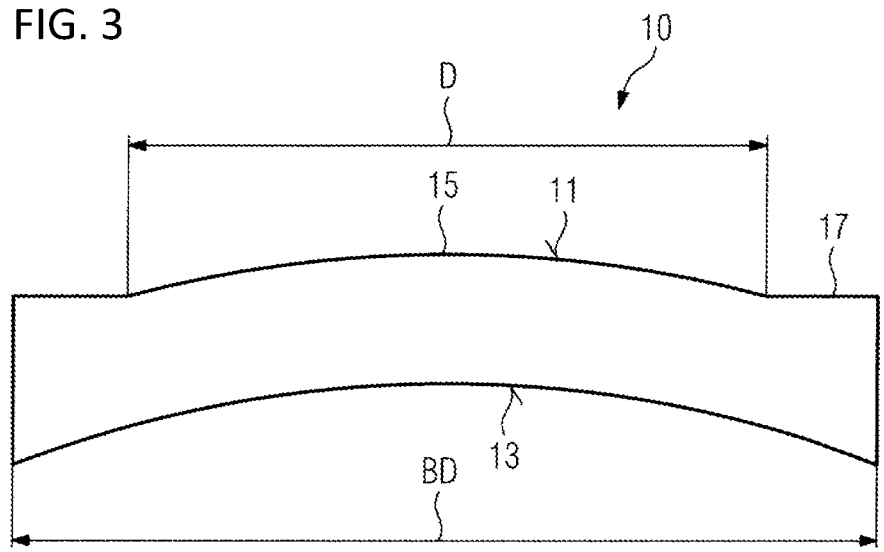
FIG. 3 shows a semi-finished lens blank used in the method of FIG. 2 in a sectional view.
Figure 4:
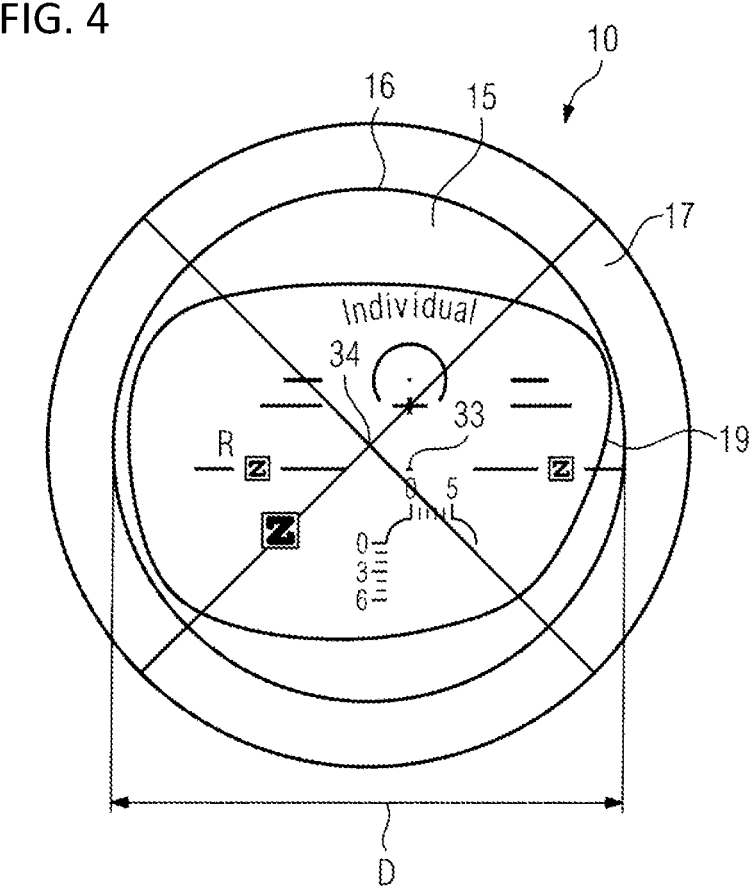
FIG. 4 shows the semi-finished lens blank of FIG. 3 in a top view together with a frame contour of a frame to which the spectacle lens to be manufactured shall be glazed.
Figure 5:
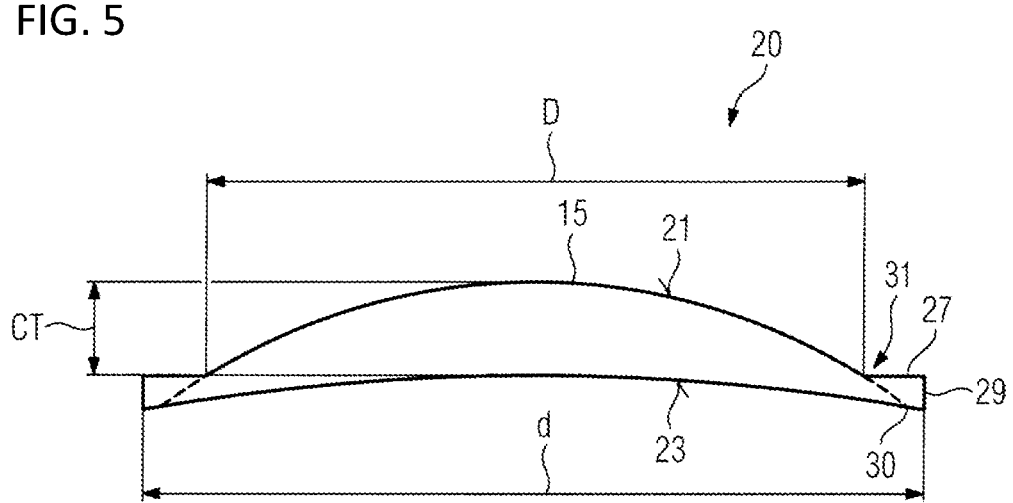
FIG. 5 shows a spectacle lens made from the semi-finished lens blank by the method shown in FIG. 2 before glazing in a sectional view.

The difficulty described with respect to FIG. 1 can be overcome or at least mitigated with the disclosed method of manufacturing a spectacle lens that will be described with respect to FIGS. 2 to 5 in which FIG. 2 shows a flowchart illustrating the disclosed method, FIG. 3 shows a semi-finished lens blank used in the disclosed method in a sectional view, FIG. 4 shows the semi-finished lens blank together with a frame contour of a frame to which the spectacle lens to be manufactures shall be glazed in a top view, and FIG. 5 shows the finished uncut spectacle lens in a sectional view.

In a first step S1 of the disclosed method prescription data and frame data of a patient are obtained. After obtaining the prescription data and the frame data representations of the lens surfaces necessary for realizing the optical correction that shall be provided according to the prescription data are calculated in step S2. This calculation includes in particular a calculation which one of a number of standardized front surface curvatures is suitable for manufacturing the spectacle lens and a calculation of the exact shape of a back surface that is to be formed.

Based on the calculated front surface, a semi-finished lens blank is selected out of a number of semi-finished lens blanks having different standardized front curvatures in Step S3, and different optical bowl diameters. An example for such a semi-finished lens blank 10 is shown in FIG. 3. The semi-finished lens blank has a curved front surface 11 including an optical bowl 15 with a convex curvature and a back surface 13 with a concave curvature. In the present exemplary embodiment, the optical bowl extends over an area delimited by a circular line with a diameter D. Outside this diameter D, the semi-finished lens blank 10 has a peripheral lentic zone 17 that surrounds the optical bowl 15 and represents a front surface lentic.

In the present exemplary embodiment, the convex curvature of the optical bowl 15 up to the peripheral lentic zone 17 is one of a number of standardized curvatures which lie typically in the range between 4D and 10D with 0.25 diopter steps in between for the manufacture of spectacle lenses with a positive spherical power. In addition, for each standardized curvature of the optical bowl 15 there are a small number of semi-finished lens blanks 10 all having the same curvature of the optical bowl 15 but a different diameters D of a circular line 16 delimiting the optical bowl 15. For example, for each curvature of the optical bowl 15 the diameter D of the a circular line 16 may be 50 mm, 55 mm, 60 mm or 65 mm. The diameter BD of the semi-finished lens blank would in all this cases be 70 mm or more. The diameter D of the circular line 16 delimiting the optical bowl 15 is shown in FIG. 4.

When selecting the semi-finished lens blank 10, such a semi-finished lens blank 10 is selected of which the convex curvature of its optical bowl 15 corresponds to the convex curvature calculated in step S2. However, in the present exemplary embodiment, the semi-finished lens blank is not only selected based on the curvature of its optical bowl 15 but also based on the frame contour of the frame to which the spectacle lens shall be glazed later on. The frame contour is retrieved from the frame data and determines what diameter D of the circular line 16 delimiting the optical bowl 15 is necessary to completely cover the frame contour (see FIG. 4) when the frame shape is centrally positioned within the optical bowl. In step S3, the semi-finished lens blank is selected with the smallest possible diameter of the circular line 16 delimiting the optical bowl 16 which allows covering the whole frame contour. This enables a minimization of the thickness of the spectacle lens to be manufactured, particularly in the case of a lens prescription having positive sphere value. Choosing a semi-finished lens blank with a larger diameter D of the circular line 16 delimiting the optical bowl 15 may result in a larger thickness of the spectacle lens to be manufactured in its geometrical center.

This peripheral lentic zone 17 may be already formed when casting the semi-finished lens blank and reduces—and in many cases eliminates—the need for machining a back surface with an altered peripheral zone as it is done in the related art. Alternatively, the peripheral lentic zone 17 might be created on a lens-by-lens basis to optimize the optical bowl dimensions to the prescription and frame data. In this case, the front surface of the inventive semi-finished lens blank would be made in this step using a surfacing process to the dimensions provided by the lens calculation, prior to surfacing the back to complete the finished uncut spectacle lens. A semi-finished lens blank according to the related art might be used as starting point for creating an inventive semi-finished lens blank.

In step S4, the selected semi-finished lens blank 10 is blocked, i.e., it is attached to a standardized machine mounting block by which it can be held to enable the back surface to be machined. Historically, the attachment has been made using a low melting point alloy, which forms a supportive medium between the front surface of the semi-finished lens blank 10 and the machine mounting block. The diameter to which the supportive blocking medium is applied will depend on the final cribbing diameter for the finished uncut spectacle lens; it is normally made as large as possible to give the best support to the semi-finished lens blank during the back surface machining process.

After blocking the semi-finished lens blank 10 in step S4, the back surface 13 of the semi-finished lens blank 10 is machined in step S5 to produce the back surface calculated in step S2. In the simplest case the back surface after machining will be a concave spherical surface. However, to minimize optical aberrations, aspherical surfaces are typically produced. In case of a prescription including an astigmatic correction, the back surface may be toric or, to minimize optical aberrations, atoric. If the spectacle lens to be manufactured is a multifocal spectacle lens, in particular a progressive power spectacle lens, the back surface after machining is a freeform surface which typically does not show any symmetry and is described by splines.

After the machining of the back surface S5 is finished, the optically effective surfaces of the spectacle lens to be manufactured have their final shape. Hence, after the machining step S5, there is no semi-finished lens blank anymore but a finished uncut spectacle lens 20. In addition, during the machining of the back surface 13, the diameter of the semi-finished lens blank 10 is reduced so that the resulting finished uncut spectacle lens 20 has a smaller diameter d than the semi-finished lens blank 10 from which it was made. This reduction of the diameter is called cribbing. However, during the cribbing the diameter is not reduced to such an extent that it would be smaller than the diameter D of the circular line 16 delimiting the optical bowl 15. As a consequence, the finished uncut spectacle lens 20 still has a peripheral lentic zone 27 that is less curved than the optical bowl 15. It is noted that the convex curvature of the optical bowl 15 and the curvature of the front surface 21 in the peripheral lentic zone 27 of the finished uncut spectacle lens 20 are the same as the curvatures of the optical bowl 15 and the peripheral lentic zone 17, respectively, of the semi-finished lens blank 10. In the present exemplary embodiment, the curvature of the front surface of the semi-finished lens blank 10 and the curvature of the front surface of the spectacle lens 20 have an infinitely large radius of curvature in the peripheral lentic zone 17. In other words the front surface of the finished uncut spectacle lens 20 is flat in the peripheral lentic zone 17 as is the front surface of the semi-finished lens blank 10 in the peripheral lentic zone 27.

From FIG. 5 it can be seen that the flat shape of the front surface 21 in the peripheral lentic zone 27 leads to a considerably larger edge thickness ET at the cribbed edge 29 of the finished uncut spectacle lens 20 compared to what would be achieved with using a semi-finished lens blank in which the diameter D of the circular line 16 delimiting the optical bowl 15 is as large or larger than the diameter d of the finished uncut spectacle lens 20 (compare dotted line at reference numeral 30). What would result from the machining process if the diameter of the circular line 16 delimiting the optical bowl 15 was as large as or larger than the diameter d of the finished uncut spectacle lens 20 is shown in FIG. 5 by dotted lines. As can be seen from the dotted lines, instead of having a positive edge thickness ET, the edge of the finished uncut spectacle lens 20 would reduce to 0 resulting in a sharp edge. Such a sharp edge would be detrimental in the following steps of the manufacturing process. To avoid the sharp edge without having a peripheral 17 zone as shown in FIG. 3 in the semi-finished lens blank 10 the thickness CT in the geometrical center of the finished uncut spectacle lens 20 would need to be larger than shown in FIG. 5 in order to increase the edge thickness from 0 to a sufficient positive value. Hence, the present disclosure allows for a minimum thickness CT of the finished uncut spectacle lens 20 in its geometrical center.

The benefits can be demonstrated by an exemplary calculation. When using a related art semi-finished blank having a spherical front surface, the thinnest lens possible occurs when the finished uncut spectacle lens has 0 mm or "knife" edge thickness, as shown by the termination of the dotted line 30 in FIG. 5. Making the same prescription finished uncut spectacle lens to the same center thickness, the same front and back central curvatures and the same cribbed diameter but from the inventive semi-finished lens blank 10 would give a finished uncut spectacle lens 20 with an edge thickness at the cribbed edge 29 which is sufficiently larger than zero. This edge thickness is equal to the difference in sag of the front surfaces of the inventive two semi-finished lens blank and the related art semi-finished lens blank between the diameters D and d. More simply still, if the peripheral lentic zone 17 of the inventive semi-finished lens blank 10 has an infinite surface radius, i.e., is OD curvature, the sag of the peripheral lentic zone 17 of the inventive semi-finished lens blank 10 is zero, meaning the edge thickness at the cribbed edge 29 for this example is simply the sag of the base curve of the optical bowl of the finished uncut spectacle lens between the diameter D of the optical bowl 15 and the diameter of the cribbed edge. This edge thickness results completely from having the peripheral lentic zone 27 because without it the finished uncut spectacle lens would have zero or knife edge thickness.

Table 1 uses this same calculation to determine the edge thickness increase resulting from using an inventive semi-finished blank 10 to construct a 75 mm diameter finished uncut spectacle lens 20, where the peripheral lentic zone 17 of the semi-finished lens blank 10 has OD or flat curve. The table lists the edge thickness increases for 3 different diameters D of optical bowl 15 the diameters being 70, 65, and 60 mm, as well as 3 different base curves expressed in 1.530 index.

TABLE 1

| | Bowl diameter | | |
|---|---|---|---|
| Base (D) | 70 mm | 65 mm | 60 mm |
| 4.25 | 0.76 mm | 1.46 mm | 2.11 mm |
| 6.25 | 1.18 mm | 2.27 mm | 3.26 mm |
| 7.25 | 1.71 mm | 2.73 mm | 3.91 mm |

Next, we consider an exemplary embodiment of a finished uncut spectacle lens for a particular spherical prescription which, when made on a 6.25 base curve, requires an infinite radius, or 0 diopter curve on its back surface. If this finished uncut spectacle lens was made to a diameter d of 65 mm with a cribbed edge thickness of 0.3 mm, its center thickness would be some nominal value greater than 0.3 mm. According to Table 1, this same prescription finished uncut spectacle lens could be made to 75 mm diameter having the same center thickness and back surface curve but with a cribbed edge thickness (0.3+2.27)=2.57 mm if using the inventive semi-finished lens blank 10 having base curve of 6.25D to an optical bowl size of 65 mm with a flat peripheral lentic zone 17. Actually, typical ophthalmic prescriptions use a back surface radius being finite and concave, meaning that the cribbed edge thickness at 75 mm diameter would be larger still than this example, while achieving the same center thickness that would be obtained from a 65 mm diameter of the cribbed edge with 0.3 mm minimum cribbed edge thickness.

When calculating the form of the finished uncut spectacle lens 20 to fulfill the lens prescription, there is a number of thickness criteria to be met, including: a) to satisfy impact safety requirements it is necessary to ensure a minimum thickness of the uncut finished spectacle lens over the region that is to be glazed to the frame; b) to ensure the finished uncut spectacle lens is robust through the surfacing processes it is necessary to ensure a minimum thickness over its full diameter d, which may be for example 0.3 mm. Due to the shape of the front surface of the inventive finished uncut spectacle lens 20, and depending on the presence of any prism in the finished uncut spectacle lens 20, the minimum thickness of the finished uncut spectacle lens 20 might occur at the position 31 of the optical bowl diameter D; c) to ensure safe handling of the finished uncut spectacle lens 20 also requires a minimum edge thickness, which may for example 0.5 mm, or 0.3 mm. Combined with these minimum thickness criteria is the priority to minimize the center thickness of the finished uncut spectacle lens 20 for the benefit of minimal weight and optimum cosmetic appearance of the glazed spectacle lens. When calculating the finished uncut spectacle lens, all of these thickness requirements must be considered. If it is found that the thickness criteria (b) or (c) lead to artificial increases in the center thickness of the finished uncut spectacle lens 20 which are not required by criteria (a), there is also the option for a lenticular back surface to be applied to steepen the shape of the back surface outside of the frame contour in the manner previously described in WO/2019/106399. The degree to which the back surface would need to be adapted would be less than compared to the related art because a significant increase in the thickness at the cribbed edge 29 would already be provided by the peripheral lentic zone 17 of inventive finished uncut spectacle lens 20, i.e., by the shape of its front surface.

In the example of Table 1 the finished uncut spectacle lens 20 is cribbed to a single 75 mm circular diameter, with the bowl diameters selected to be as small as possible while still encompassing the frame contour, so as to maximize the thickness increase at the cribbed edge of the uncut finished spectacle lens. The use of a single diameter the uncut finished spectacle lens is advantageous to blocking the uncut finished spectacle lens because a single diameter of blocking medium can be applied which speeds automation of the process while allowing full mechanical support of the uncut finished spectacle lens. Having a single circular diameter of the uncut finished spectacle lens also simplifies the process of polishing the uncut finished spectacle lens and of robotic handling process where the uncut finished spectacle lens is gripped from the edges.

Once the machining of the back surface is completed, the finished uncut spectacle lens may be engraved with semi-visible or visible logos to identify the finished uncut spectacle lens type and the position of the design optical center. Since the disclosed method designs the back surface to place the frame contour centrally within the optical bowl, the design optical center 33 may not coincide with the geometric center 34 of the finished uncut spectacle lens. Accordingly, any engravings used mark the placement of the design center 33 of the finished uncut spectacle lens may not be symmetrically placed around the geometric center 34 of the finished uncut spectacle lens. FIG. 4 shows the semisfinished lens blank 10 with its geometrical center 34 and the design optical center 33 as given by the shape to be machined into the back surface.

The finished uncut spectacle lens may be further subject to one or more coating processes in step S6. During these coating processes, the finished uncut spectacle lens 20 is gripped by its cribbed edge 29. In the present exemplary embodiment, step S6 includes a first coating process in which a hard coating is applied to the surfaces 21, 23 of the finished uncut spectacle lens 20 and a second coating process in which an anti-reflective coating is applied to the surfaces 21, 23 of the finished uncut spectacle lens 20. Since, the diameter d of the finished uncut spectacle lens 20 is larger than what is necessary for glazing the spectacle lens 20 to the frame any coating defects around the cribbed edge 29 like, for example, coating clip marks, resin roll back, etc., are removed during the edging process when the cribbed spectacle lens 20 is glazed to the frame.

Although, manufacturing the finished uncut spectacle lens 20 is usually finished after the coating step S6, i.e., when the finished uncut spectacle lens 20 is coated, the manufacturing method may optionally include a step S7 of glazing the spectacle lens 20 to the frame if this is requested by the purchaser.

Figure 6:
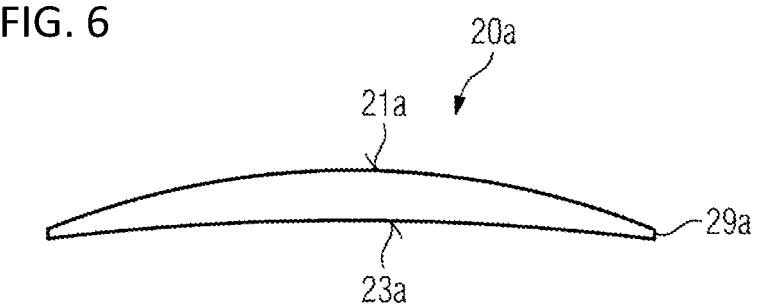
FIG. 6 shows a finished uncut spectacle lens providing an optical correction with a small lens diameter.
Figure 7:
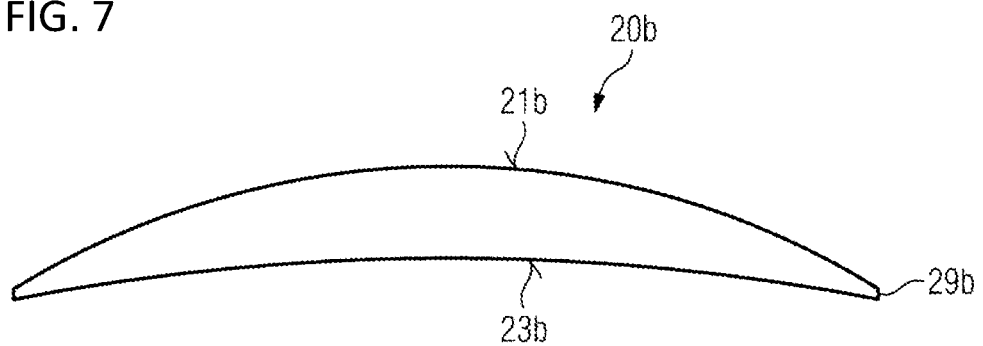
FIG. 7 shows a finished uncut spectacle lens providing the same optical correction as the spectacle lens shown in FIG. 6 but has a larger diameter and larger center thickness.
Figure 8:
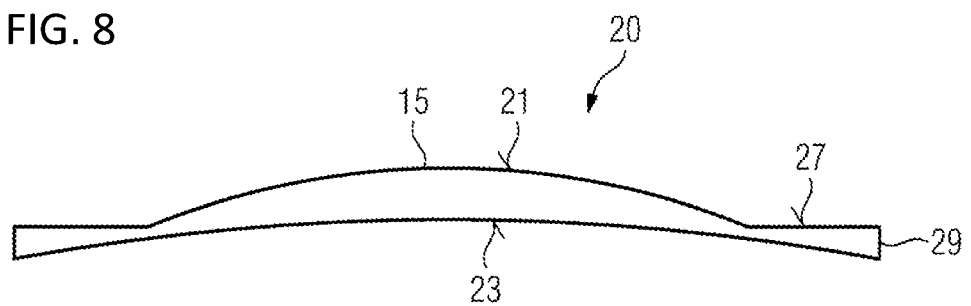
FIG. 8 shows an inventive finished uncut spectacle lens that provides the same center thickness and optical correction as the spectacle lenses shown in FIG. 6 and has the same diameter as the spectacle lens shown in FIG. 7.

An advantage of the present disclosure becomes clear from the different finished uncut spectacle lens shown in FIGS. 6 to 8. FIG. 6 shows a finished uncut spectacle lens 20a with a diameter of 50 mm and a lens thickness in its geometrical center of 4.20 mm. In addition, the finished uncut spectacle lens 20a of FIG. 6 has a front surface 21a with a curvature of 8D. FIG. 7 shows a finished uncut spectacle lens 20b with the same curvature of its front surface 21b as the spectacle lens of FIG. 6 but with a diameter of 70 mm and center thickness 7.5 mm. Both finished uncut spectacle lenses 20a, 20b have a thickness of the cribbed edge 29a, 29b of 0.3 mm. FIG. 8 shows a finished uncut spectacle lens 20 according to the present disclosure. The inventive finished uncut spectacle lens 20 has a diameter of 70 mm like the finished uncut spectacle lens 20b and an optical bowl 15 which is delimited by a circular line having a diameter of 50 mm. The convex curvature of the optical bowl 15 is 8D which is the same curvature as the curvature of the front surfaces 21a and 21b of the spectacle lenses 20a and 20b shown in FIGS. 6 and 7. The thickness of the optical bowl 15 in its geometrical center is only 4.2 mm. Please note that all three spectacle lenses 20a, 20b, and 20 have back surfaces 23a, 23b, and 23 with the same curvature. It can be seen from FIGS. 6 to 8 that although having the same cribbed diameter as the spectacle lens 20b shown in FIG. 7 the spectacle lens 20 shown in FIG. 8 has only a thickness in its geometrical center corresponding to the thickness of the spectacle lens 20a shown in FIG. 6.

The present disclosure has been described with respect to specific exemplary embodiments thereof for illustrating the principles of the disclosure. However, a person skilled in the art recognizes that a deviation from the specific exemplary embodiments is possible without departing from the principles of the disclosure. For example, it is not essential for the disclosed method to include a number of semi-finished lens blanks with different diameters of their optical bowls. Having semi-finished lens blanks with different diameters of their optical bowls is, however, advantageous in that it not only allows reducing the thickness of the finished uncut spectacle lens as compared to the related art but also allows to achieve a minimum thickness of the cribbed finished uncut spectacle lens. The inventive front surface can be cast into the semi-finished blank or alternatively could be machined on a lens by lens basis to create a bespoke front surface optimized physical dimensions for the particular frame and prescription details.

In an exemplary embodiment only the section of the finished uncut spectacle lens being located within the optical bowl of front surface is glazed to the frame, therefore the surrounding peripheral lentic zone needs not be optically perfect. This means for example that machining marks could still be present in the peripheral lentic zone of the inventive finished uncut spectacle lens without detracting from its utility. This relaxed requirement has implications for the surface quality of the mold used to cast the inventive semi-finished lens blank, as well as the machining process that could be used to surface the front surface of the inventive semi-finished lens blank from a related art puck.

It is also not essential that the diameter of the optical bowl is large enough to cover the whole frame contour. However, this would result in a spectacle lens after glazing in which some reminder of the peripheral lentic zone 27 is still present which would, in turn, lead to an undesired aesthetic impression imparted by such a spectacle lens and to optical aberrations perceived by the user of such a spectacle lens in the peripheral field of view. Therefore, having a diameter of the optical bowl that is large enough to fully cover the frame contour of the frame to which the spectacle lens shall be glazed is recommended. Further modifications of the described exemplary embodiments are within the reach of a person skilled in the art. Therefore, the present disclosure shall not be delimited by the described specific exemplary embodiments but only by the appended claims.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 1 front surface
3 back surface
10 semi-finished lens blank
11 front surface
13 back surface
15 optical bowl
16 optical bowl circumference
17 peripheral lentic zone
19 frame contour
20 finished uncut spectacle lens
21 front surface
23 back surface
27 peripheral lentic zone 29 cribbed edge of the finished uncut spectacle lens for a finished uncut spectacle lens made using the inventive semi-finished blank
30 cribbed edge of finished uncut spectacle lens for a finished uncut spectacle lens made using a related art semi-finished blank having a uniform spherical front curve
31 position of minimum thickness
33 design optical center
34 geometric center
d diameter
d1 diameter
BD diameter of the semi-finished lens blank
D optical bowl diameter
ET edge thickness
CT center thickness of the uncut finishes spectacle lens
CTSF center thickness of the semi-finished lens blank
S1 obtaining prescription data and frame data
S2 calculating lens surfaces
S3 selecting semi-finished lens blank
S4 blocking
S5 machining
S6 coating
S8 glazing

The invention claimed is:

1. A method of manufacturing a finished uncut spectacle lens, the method comprising:
    obtaining prescription data representing a prescribed optical correction for a wearer of the finished uncut spectacle lens to be manufactured;
    obtaining frame data;
    selecting a semi-finished lens blank with a curved front surface including an optical bowl having a convex curvature, wherein the optical bowl has dimensions large enough to cover a whole contour of a frame according to the frame data; and
    machining the semi-finished lens blank to create the finished uncut spectacle lens based on the prescription data,
    wherein the semi-finished lens blank has a peripheral lentic zone in which the curvature of the curved front surface deviates from the convex curvature of the optical bowl.

2. The method as claimed in claim 1, further comprising:
    selecting the semi-finished lens blank to have the convex curvature of the optical bowl already matching the curvature of the front surface of the finished uncut spectacle lens to be manufactured; and
    applying the machining of the semi-finished lens blank solely to a back surface of the semi-finished lens blank.

3. The method as claimed in claim 1, further comprising:
    surfacing the optical bowl of a standardized semi-finished lens blank to form a customized convex curvature and customized dimensions of the optical bowl based on the prescription data and the frame data.

4. The method as claimed in claim 1, further comprising:
    calculating a surface representation of the back surface to be achieved by machining, wherein the calculation of the surface representation accounts for the dimensions of the optical bowl and the frame data such that the center of the surface representation is offset from the center of the finished uncut spectacle lens; and
    machining the back surface of the semi-finished lens blank to achieve the back surface according to the calculated surface representation.

5. The method as claimed in claim 1, further comprising:
    calculating a modified back surface to be formed in the peripheral lentic zone by machining, wherein a lenticular back surface is calculated based on the dimensions of the optical bowl, the frame data, the prescription data, and a minimum lens thickness requirement.

6. The method as claimed in claim 1, further comprising:
    machining the semi-finished lens blank such that the finished uncut spectacle lens has:
        a curved front surface including an optical bowl with a convex curvature; and
        a peripheral lentic zone surrounding the optical bowl, wherein the curvature of the curved front surface in the peripheral lentic zone deviates from the convex curvature of the optical bowl.

7. A finished uncut spectacle lens comprising:
    a curved front surface including an optical bowl with a convex curvature; and
    a peripheral lentic zone surrounding the optical bowl,
        wherein the curvature of the curved front surface in the peripheral lentic zone deviates from the convex curvature of the optical bowl,
        wherein the lens has a concavely curved back surface which includes a concave effective curvature which provides, together with the convex curvature of the optical bowl, a prescribed optical correction, and the effective curvature has a radius of curvature that is smaller than the radius of curvature of the front surface in the peripheral lentic zone,
        wherein the optical bowl with the convex curvature extends over an area of the spectacle lens that is large enough to cover a frame contour of a frame to which the spectacle lens shall be glazed, and
        wherein the concavely curved back surface is also concave in the peripheral lentic zone, and the radius of curvature of the front surface in the peripheral lentic zone is an infinite radius.

8. The finished uncut spectacle lens as claimed in claim 7, wherein the convex curvature of the optical bowl is steeper than the curvature of the front surface in the peripheral lentic zone.

9. The finished uncut spectacle lens as claimed in claim 7, wherein, in the peripheral lentic zone, the curvature of the back surface deviates from the effective curvature.

10. The finished uncut spectacle lens as claimed in claim 7, wherein the effective curvature of the back surface extends over an area of the spectacle lens that is large enough to cover a frame contour of a frame to which the spectacle lens shall be glazed.

11. The finished uncut spectacle lens as claimed in claim 7, wherein the finished uncut spectacle lens has a positive spherical power.

12. A semi-finished lens blank for manufacturing a spectacle lens, the semi-finished lens blank comprising:
    a curved front surface including an optical bowl with a convex curvature; and
    a back surface with a concave curvature and a peripheral lentic zone surrounding the optical bowl,
        wherein the curvature of the curved front surface in the peripheral lentic zone deviates from the convex curvature of the optical bowl,
        wherein the optical bowl with the convex curvature extends over an area of the semi-finished lens blank that is large enough to cover a frame contour of a frame to which the spectacle lens to be manufactured from the semi-finished lens blank shall be glazed, and wherein the concave curvature of the back surface is also present in the peripheral lentic zone, and the radius of curvature of the front surface in the peripheral lentic zone is an infinite radius.

13. The semi-finished lens blank as claimed in claim 12, wherein the convex curvature of the optical bowl is steeper than the curvature of the front surface in the peripheral lentic zone.

14. A finished uncut spectacle lens comprising:
a curved front surface including an optical bowl with a convex curvature; and
a peripheral lentic zone surrounding the optical bowl,
wherein the curvature of the curved front surface in the peripheral lentic zone deviates from the convex curvature of the optical bowl,
wherein the finished uncut lens has a concavely curved back surface that includes a concave effective curvature which provides, together with the convex curvature of the optical bowl, a prescribed optical correction, and the effective curvature has a radius of curvature that is smaller than the radius of curvature of the front surface in the peripheral lentic zone, and
wherein the radius of curvature of the front surface in the peripheral lentic zone is an infinite radius, and the concavely curved back surface is also present in the peripheral lentic zone.

15. The finished uncut spectacle lens as claimed in claim 14, wherein the optical bowl with the convex curvature extends over an area of the spectacle lens that is large enough to cover a frame contour of a frame to which the spectacle lens shall be glazed.

16. The finished uncut spectacle lens as claimed in claim 14, wherein, in the peripheral lentic zone, the curvature of the back surface deviates from the effective curvature.

17. The finished uncut spectacle lens as claimed in claim 14, wherein the effective curvature of the back surface extends over an area of the spectacle lens that is large enough to cover a frame contour of a frame to which the spectacle lens shall be glazed.

18. The finished uncut spectacle lens as claimed in claim 14, wherein the finished uncut spectacle lens has a positive spherical power.

19. A semi-finished lens blank for manufacturing a spectacle lens, the semi-finished lens blank comprising:
a curved front surface including an optical bowl with a convex curvature;
a peripheral lentic zone surrounding the optical bowl; and
a back surface with a concave curvature,
wherein the curvature of the curved front surface in the peripheral lentic zone deviates from the convex curvature of the optical bowl, and
wherein the radius of curvature of the front surface in the peripheral lentic zone is an infinite radius, and the concavely curved back surface is also present in the peripheral lentic zone.

* * * * *

UNITED STATES PATENT AND TRADEMARK OFFICE
CERTIFICATE OF CORRECTION

PATENT NO. : 11,307,436 B2
APPLICATION NO. : 17/373421
DATED : April 19, 2022
INVENTOR(S) : Nolan et al.

It is certified that error appears in the above-identified patent and that said Letters Patent is hereby corrected as shown below:

In the Specification

In Column 15, Line 23, change "is OD" to -- is 0D --

In Column 15, Line 37, change "has OD" to -- has 0D --

Signed and Sealed this
Twenty-eighth Day of June, 2022

Katherine Kelly Vidal
*Director of the United States Patent and Trademark Office*